US012659361B2

(12) United States Patent (10) Patent No.: US 12,659,361 B2
Liu (45) Date of Patent: Jun. 16, 2026

(54) REGISTRATION METHOD AND ELECTRONIC DEVICE

(71) Applicant: Nokia Technologies Oy, Espoo (FI)

(72) Inventor: Xu Liu, Dongguan (CN)

(73) Assignee: Nokia Technologies Oy, Espoo (FI)

( * ) Notice: Subject to any disclaimer, the term of this patent is extended or adjusted under 35 U.S.C. 154(b) by 469 days.

(21) Appl. No.: 17/899,708

(22) Filed: Aug. 31, 2022

(65) Prior Publication Data

US 2022/0417296 A1 Dec. 29, 2022

Related U.S. Application Data

(63) Continuation of application No. PCT/CN2021/081610, filed on Mar. 18, 2021.

(30) Foreign Application Priority Data

Mar. 23, 2020 (CN) .......................... 202010210089.X

(51) Int. Cl.
 *H04L 65/1073* (2022.01)
 *H04L 65/1016* (2022.01)
 *H04W 8/18* (2009.01)
(52) U.S. Cl.
 CPC ...... *H04L 65/1073* (2013.01); *H04L 65/1016* (2013.01); *H04W 8/183* (2013.01)
(58) Field of Classification Search
 CPC . H04L 65/1016; H04L 65/1073; H04W 8/183
 See application file for complete search history.

(56) References Cited

U.S. PATENT DOCUMENTS

| | | | |
|---|---|---|---|
| 6,249,810 B1 | 6/2001 | Kiraly | |
| 9,826,570 B1 | 11/2017 | Gupta et al. | |
| 2008/0119183 A1* | 5/2008 | Kono | H04W 36/0066 |
| | | | 455/552.1 |
| 2009/0103455 A1 | 4/2009 | Balasubramanian et al. | |
| 2009/0276532 A1* | 11/2009 | Bishop | H04L 65/1095 |
| | | | 709/228 |
| 2018/0220329 A1* | 8/2018 | Arumugam | H04L 65/1073 |

FOREIGN PATENT DOCUMENTS

| | | |
|---|---|---|
| CN | 104427484 A | 3/2015 |
| CN | 104519537 A | 4/2015 |
| CN | 106851755 A | 6/2017 |

(Continued)

*Primary Examiner* — Mansour Oveissi
(74) *Attorney, Agent, or Firm* — McCarter & English, LLP

(57) ABSTRACT

A registration method, includes: obtaining, in a process in which a preset application downloads data through a communication radio frequency link, a remaining online duration of an electronic device registered in the Internet protocol multimedia subsystem; obtaining a data demand of the preset application in a case that the remaining online duration is greater than a first preset duration and less than a second preset duration, where the first preset duration is greater than or equal to a duration required for the electronic device to re-register in the Internet protocol multimedia subsystem; and performing, in a case that the data demand is less than a preset data demand, re-registration in the Internet protocol multimedia subsystem through the communication radio frequency link.

15 Claims, 4 Drawing Sheets

Obtain, in a process in which a preset application downloads data through the communication radio frequency link, a remaining online duration of the electronic device registered in the Internet protocol multimedia subsystem ⟩ 101

Obtain a data demand of the preset application in a case that the remaining online duration is greater than a first preset duration and less than a second preset duration, where the first preset duration is greater than or equal to a duration required for the electronic device to re-register in the Internet protocol multimedia subsystem ⟩ 102

Perform, in a case that the data demand is less than a preset data demand, re-registration in the Internet protocol multimedia subsystem through the communication radio frequency link ⟩ 103

(56)     References Cited

FOREIGN PATENT DOCUMENTS

| CN | 106911713 | A | 6/2017 |
|----|-----------|---|--------|
| CN | 107454585 | A | 12/2017 |
| CN | 107466033 | A | 12/2017 |
| CN | 110234109 | A | 9/2019 |
| CN | 110300404 | A | 10/2019 |
| CN | 110351110 | A | 10/2019 |
| CN | 110536409 | A | 12/2019 |
| CN | 111447196 | A | 7/2020 |
| EP | 2114047 | A1 | 11/2009 |
| JP | 2001034435 | A | 2/2001 |

* cited by examiner

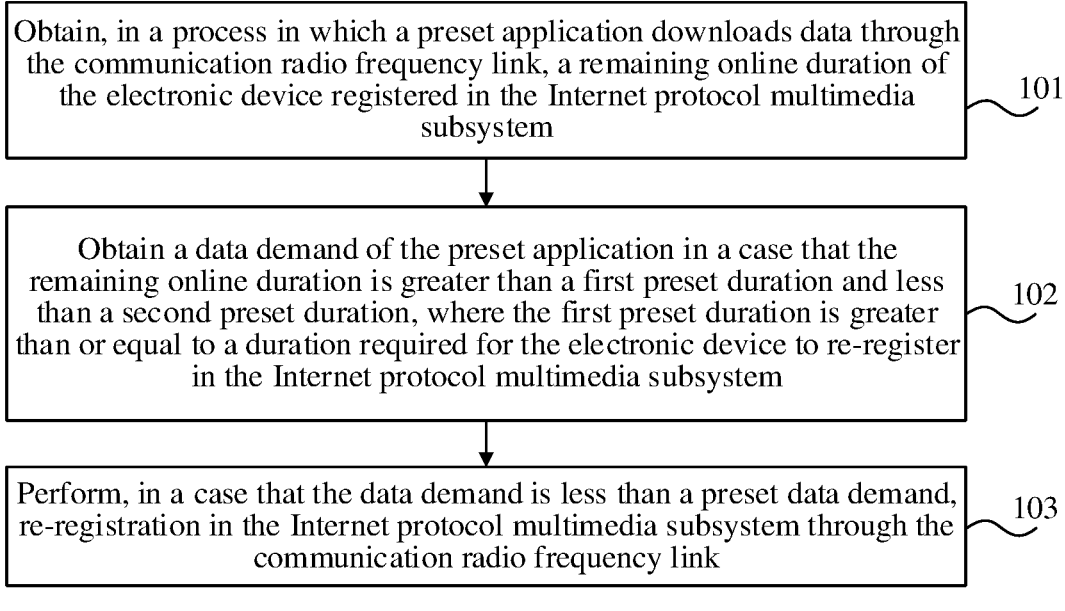

Obtain, in a process in which a preset application downloads data through the communication radio frequency link, a remaining online duration of the electronic device registered in the Internet protocol multimedia subsystem ⌐~101

Obtain a data demand of the preset application in a case that the remaining online duration is greater than a first preset duration and less than a second preset duration, where the first preset duration is greater than or equal to a duration required for the electronic device to re-register in the Internet protocol multimedia subsystem ⌐~102

Perform, in a case that the data demand is less than a preset data demand, re-registration in the Internet protocol multimedia subsystem through the communication radio frequency link ⌐~103

FIG. 1

Obtain, in a process in which a preset application downloads data through the communication radio frequency link based on the first subscriber identification module, a remaining online duration of the second subscriber identification module registered in the Internet protocol multimedia subsystem ⌐~201

Obtain a data demand of the preset application in a case that the remaining online duration is greater than a first preset duration and less than a second preset duration, where the first preset duration is greater than or equal to a duration required for the second subscriber identification module to re-register in the Internet protocol multimedia subsystem ⌐~202

Set, in a case that the data demand is less than the preset data demand, that the second subscriber identification module performs re-registration in the Internet protocol multimedia subsystem through the communication radio frequency link ⌐~203

FIG. 2

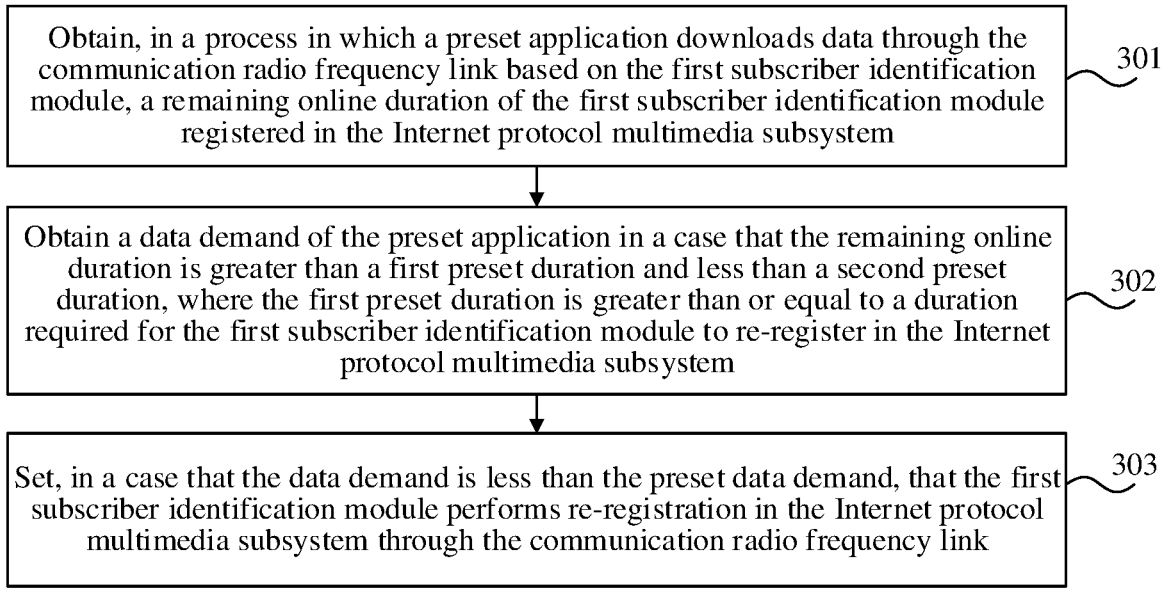

Obtain, in a process in which a preset application downloads data through the communication radio frequency link based on the first subscriber identification module, a remaining online duration of the first subscriber identification module registered in the Internet protocol multimedia subsystem ⟋301

Obtain a data demand of the preset application in a case that the remaining online duration is greater than a first preset duration and less than a second preset duration, where the first preset duration is greater than or equal to a duration required for the first subscriber identification module to re-register in the Internet protocol multimedia subsystem ⟋302

Set, in a case that the data demand is less than the preset data demand, that the first subscriber identification module performs re-registration in the Internet protocol multimedia subsystem through the communication radio frequency link ⟋303

FIG. 3

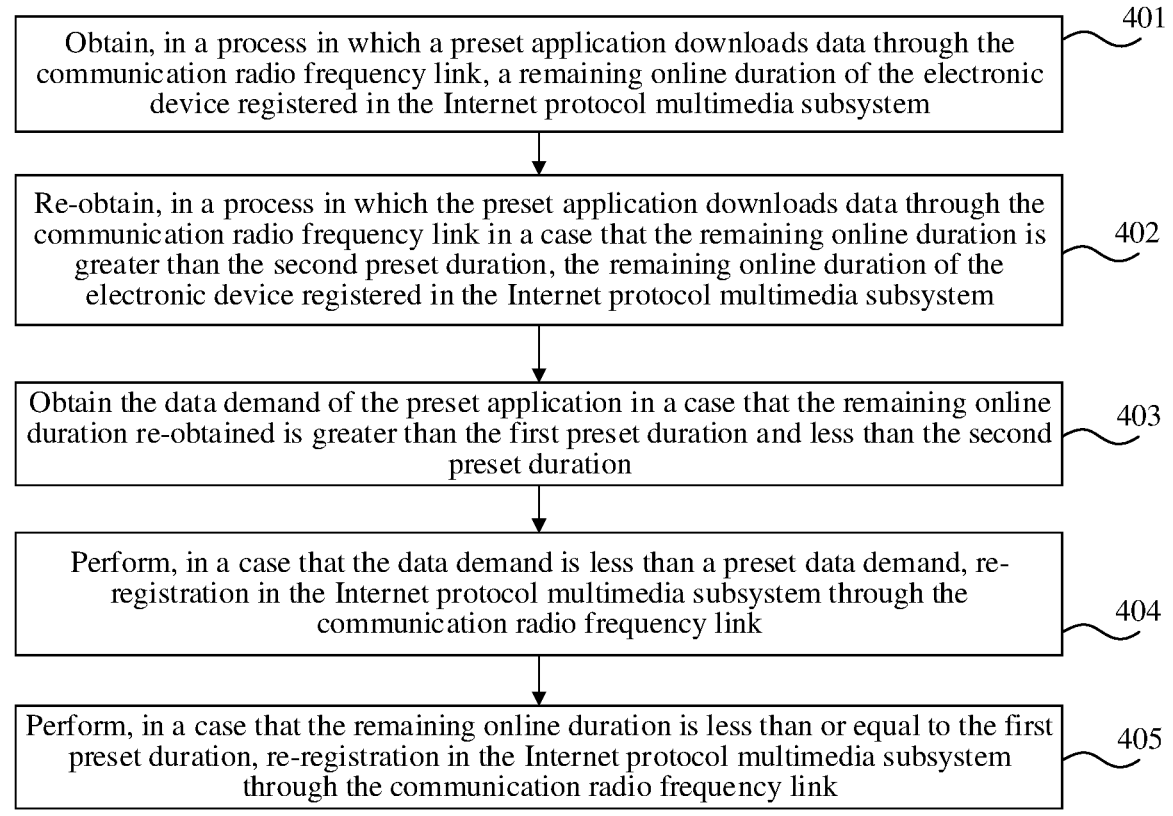

Obtain, in a process in which a preset application downloads data through the communication radio frequency link, a remaining online duration of the electronic device registered in the Internet protocol multimedia subsystem ⟋401

Re-obtain, in a process in which the preset application downloads data through the communication radio frequency link in a case that the remaining online duration is greater than the second preset duration, the remaining online duration of the electronic device registered in the Internet protocol multimedia subsystem ⟋402

Obtain the data demand of the preset application in a case that the remaining online duration re-obtained is greater than the first preset duration and less than the second preset duration ⟋403

Perform, in a case that the data demand is less than a preset data demand, re-registration in the Internet protocol multimedia subsystem through the communication radio frequency link ⟋404

Perform, in a case that the remaining online duration is less than or equal to the first preset duration, re-registration in the Internet protocol multimedia subsystem through the communication radio frequency link ⟋405

FIG. 4

REGISTRATION METHOD AND ELECTRONIC DEVICE

CROSS-REFERENCE TO RELATED APPLICATIONS

This application is a Bypass Continuation Application of PCT/CN2021/081610, filed on Mar. 18, 2021, and claims the priority of Chinese Patent Application No. 202010210089.X, filed on Mar. 23, 2020, the disclosures of which are hereby incorporated by reference in their entirety.

BACKGROUND OF THE INVENTION

Field of the Invention

Embodiments of the present disclosure relate to the field of communication technologies, and in particular, to a registration method and an electronic device.

Description of Related Art

The Internet protocol multimedia subsystem (IMS) can meet the requirements of newer and more diversified multimedia services, resolve the integration of mobile and fixed networks, and introduce differentiated services such as triple integration of voice, data, and video, and therefore has been widely used.

Currently, an electronic device needs to send a registration message through a communication radio frequency link for re-registration before the electronic device is disconnected from the IMS, so as to ensure that the electronic device can continuously use the IMS.

However, for electronic devices that share a communication radio frequency link, registration performed in the IMS in a process in which an application downloads data by using the communication radio frequency link is likely to affect the smooth running of the application.

SUMMARY OF THE INVENTION

The present disclosure provides a registration method and an electronic device.

According to a first aspect, an embodiment of the present disclosure provides a registration method, performed by an electronic device. The electronic device includes: a communication radio frequency link, the electronic device is connected to an Internet protocol multimedia subsystem, and the method includes:

obtaining, in a process in which a preset application downloads data through the communication radio frequency link, a remaining online duration of the electronic device registered in the Internet protocol multimedia subsystem;

obtaining a data demand of the preset application in a case that the remaining online duration is greater than a first preset duration and less than a second preset duration, where the first preset duration is greater than or equal to a duration required for the electronic device to re-register in the Internet protocol multimedia subsystem; and performing, in a case that the data demand is less than a preset data demand, re-registration in the Internet protocol multimedia subsystem through the communication radio frequency link.

According to a second aspect, an embodiment of the present disclosure further provides an electronic device. The electronic device includes: a communication radio frequency link, the electronic device is connected to an Internet protocol multimedia subsystem, and the electronic device includes:

a remaining online duration obtaining module, configured to obtain, in a process in which a preset application downloads data through the communication radio frequency link, a remaining online duration of the electronic device registered in the Internet protocol multimedia subsystem;

a data demand obtaining module, configured to obtain a data demand of the preset application in a case that the remaining online duration is greater than a first preset duration and less than a second preset duration, where the first preset duration is greater than or equal to a duration required for the electronic device to re-register in the Internet protocol multimedia subsystem; and a first registration module, configured to perform, in a case that the data demand is less than a preset data demand, re-registration in the Internet protocol multimedia subsystem through the communication radio frequency link.

According to a third aspect, an embodiment of the present disclosure further provides an electronic device. The electronic device includes a processor, a memory, and a computer program stored in the memory and executable by the processor, the computer program, when executed by the processor, implementing steps of the registration method according to the present disclosure.

According to a fourth aspect, an embodiment of the present disclosure further provides a non-transitory compute readable storage medium. The non-transitory computer readable storage medium stores a computer program, the computer program, when executed by a processor, implementing steps of the registration method according to the present disclosure.

BRIEF DESCRIPTION OF THE DRAWINGS

FIG. 1 is a flowchart of a first registration method according to an embodiment of the present disclosure;

FIG. 2 is a flowchart of a second registration method according to an embodiment of the present disclosure;

FIG. 3 is a flowchart of a third registration method according to an embodiment of the present disclosure;

FIG. 4 is a flowchart of a fourth registration method according to an embodiment of the present disclosure;

DESCRIPTION OF THE INVENTION

Figure 5:
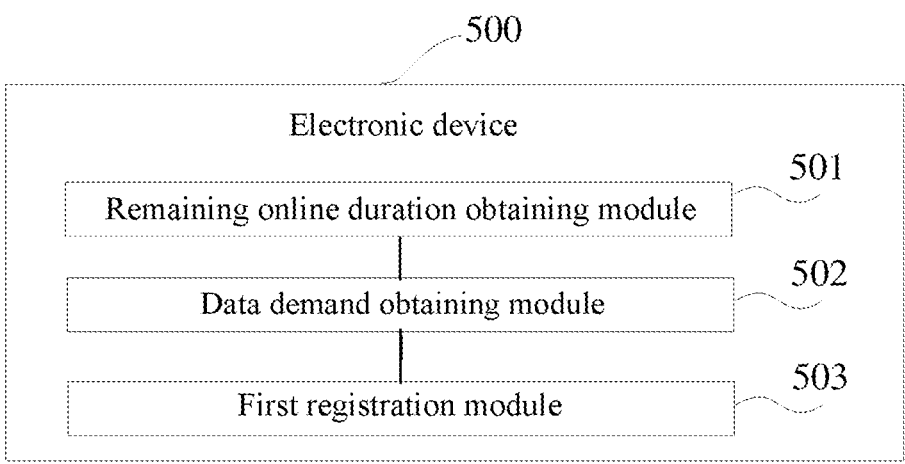
FIG. 5 is a structural block diagram of an electronic device according to an embodiment of the present disclosure.

The technical solutions of embodiments of the present disclosure are clearly described below with reference to the accompanying drawings in the embodiments of the present disclosure. Obviously, the described embodiments are a part rather than all of the embodiments of the present disclosure. All other embodiments obtained by a person of ordinary skill in the art based on the embodiments of the present disclosure shall fall within the protection scope of the present disclosure.

It should be understood that "an embodiment" or "one embodiment" mentioned throughout the specification means that specific characteristics, structures or properties relevant to the embodiments are included in at least one embodiment of the present disclosure. Therefore, "in an embodiment" or "in one embodiment" occurs in everywhere throughout the specification may not necessarily refer to the same embodiment. In addition, these specific features, structures, or properties may be merged in one or more embodiments in any proper manner.

It should be understood that sequence numbers of following processes do not mean execution sequences in various embodiments of the present disclosure. The execution sequences of the processes should be determined according to functions and internal logic of the processes, and should not be construed as any limitation on the implementation processes of the embodiments of the present disclosure.

An electronic device needs to send a registration message through a communication radio frequency link for re-registration before the electronic device is disconnected from the IMS, so as to ensure that the electronic device can continuously use the IMS.

However, for electronic devices that share a communication radio frequency link, registration performed in the IMS in a process in which an application downloads data by using the communication radio frequency link is likely to affect the smooth running of the application.

FIG. 1 is a flowchart of a first registration method according to an embodiment of the present disclosure. The registration method is performed by an electronic device, and the electronic device may include: a mobile phone, a notebook computer, a tablet computer, or the like. This is not specifically limited in this embodiment of the present disclosure. The electronic device includes a communication radio frequency link, and an application runnable and installed in the electronic device. The electronic device is connected to an Internet protocol multimedia subsystem, that is, the electronic device is connected to the IMS. The registration method may include following actions.

Action 101, obtain, in a process in which a preset application downloads data through the communication radio frequency link, a remaining online duration of the electronic device registered in the Internet protocol multimedia subsystem.

In this embodiment of the present disclosure, the preset application may be an application that needs to download data during running, or the like, and the preset application is not specifically limited. The preset application may be an application that has a higher requirement on the real-time performance, or the like. The quantity of preset applications is also not specifically limited.

After the electronic device has successfully registered in the IMS, an IMS server will assign an online duration to the electronic device. The electronic device is connected to the IMS before the online duration expires, and the electronic device will be disconnected from the IMS after the online duration expires. To avoid being disconnected from the IMS, the electronic device needs to re-register in the IMS server before the online duration expires. After the re-registration has succeeded, the IMS server will re-assign an online duration to the electronic device. This mode is repeated to ensure that the electronic device is not disconnected from the IMS.

For example, after the electronic device has successfully registered in the IMS, the online duration assigned by the IMS server to the electronic device is 20 minutes, that is, the electronic device is connected to the IMS within 20 minutes. To avoid being disconnected from the IMS, the electronic device needs to re-register in the IMS server before the online duration 20 minutes expires.

Generally, after the online duration is obtained, the electronic device will assign a timer to continuously detect a remaining online duration of the electronic device registered in the IMS, and remind the electronic device to re-register before the online duration expires.

The remaining online duration of the electronic device registered in the IMS is a remaining online duration of the electronic device registered in the IMS at the current moment. For example, for the above example, after the electronic device has successfully registered in the IMS at 10:00:00 on Jan. 29, 2020, an online duration assigned by the IMS server to the electronic device is 20 minutes. Therefore, at 10:04:00 on Jan. 29, 2020, a remaining online duration of the electronic device registered in the IMS is 16 minutes.

In a process in which the preset application of the electronic device downloads data through the communication radio frequency link by using a mobile network, the electronic device may obtain the remaining online duration of the electronic device registered in the IMS by using the above timer. This is not specifically limited in this embodiment of the present disclosure.

Optionally, during the online duration of the electronic device registered in the IMS, the quality of making calls is generally good, and the speed of sending text messages and multimedia messages is generally fast. This is not specifically limited in this embodiment of the present disclosure.

Action 102, obtain a data demand of the preset application in a case that the remaining online duration is greater than a first preset duration and less than a second preset duration, where the first preset duration is greater than or equal to a duration required for the electronic device to re-register in the Internet protocol multimedia subsystem.

In this embodiment of the present disclosure, the first preset duration needs to be greater than or equal to the duration required for the electronic device to re-register in the IMS, to ensure that the electronic device is still not disconnected from the IMS when starting re-registration in a case that the remaining online duration is the above first preset duration.

For example, if the duration required for the electronic device to re-register in the IMS is 30 seconds, the first preset duration needs to be greater than or equal to 30 seconds. It should be noted that, to fully ensure that the electronic device is not disconnected from the IMS, the first preset duration may be generally much greater than the duration required for the electronic device to re-register in the IMS. For example, for the above example, the above first preset duration may be 3 minutes, and the first preset duration 3 minutes is six times of the duration 30 seconds required for the electronic device to re-register in the IMS.

The above second preset duration may be set according to a total online duration assigned by the IMS server to the electronic device, and the second preset duration may be less than or equal to the total online duration assigned by the IMS server to the electronic device. It should be noted that, the above second preset duration may be generally much less than the total online duration assigned by the IMS server to the electronic device, and the effect thereof lies in that: if re-registration is performed in a case that the remaining online duration is relatively long, an unexpired online duration will be wasted, resulting in resource waste. However, the second preset duration is reasonably set in this application, so that the resource waste can be avoided.

For example, for the above example, after the electronic device has successfully registered in the IMS, the online duration assigned by the IMS server to the electronic device is 20 minutes, and the second preset duration may be 15 minutes.

In a case that the remaining online duration of the electronic device registered in the IMS is greater than the above first preset duration and less than the above second preset duration, the data demand of the preset application is obtained. The data demand of the preset application may be obtained through a modem module of the electronic device. This is not specifically limited in this embodiment of the present disclosure.

Action 103, perform, in a case that the data demand is less than a preset data demand, re-registration in the Internet protocol multimedia subsystem through the communication radio frequency link.

In this embodiment of the present disclosure, the preset data demand may be set according to actual requirements, which is not specifically limited in this embodiment of the present disclosure.

In a case that the remaining online duration of the electronic device registered in the IMS is greater than the above first preset duration and less than the above second preset duration and the data demand of the preset application is less than the preset data demand, it indicates that the electronic device can re-register in time, and even if the communication radio frequency link is occupied by re-registration, the preset application can also run relative smoothly, and does not get stuck or affect the usage experience of the user on the preset application. Therefore, re-registration may be performed in the IMS through the above communication radio frequency link, to maintain that the electronic device is not disconnected from the IMS.

In this embodiment of the present disclosure, in the process in which the preset application downloads data through the communication radio frequency link, in a case that the remaining online duration of the electronic device registered in the IMS is still relatively long, the electronic device does not directly re-register in the IMS through the communication radio frequency link, but re-registers in the IMS when the preset application has a smaller data demand on a premise of ensuring that the electronic device is not disconnected from the IMS, which ensures that the electronic device is not disconnected from the IMS, and the preset application can run smoothly during re-registration.

FIG. 2 is a flowchart of a second registration method according to an embodiment of the present disclosure. The registration method is similarly performed by an electronic device, the electronic device includes a communication radio frequency link, and the electronic device is connected to an IMS. For the electronic device, reference may be made to the above description. To avoid repetition, details are not described herein again. It should be noted that, a first subscriber identification module (SIM) and a second subscriber identification module are installed in the electronic device, that is, the electronic device may be an electronic device with a dual-card and dual-standby, or an electronic device with a multi-card and multi-standby. The electronic device is connected to the IMS through the second SIM. The registration method may include following actions.

Action 201, obtain, in a process in which a preset application downloads data through the communication radio frequency link based on the first subscriber identification module, a remaining online duration of the second subscriber identification module registered in the Internet protocol multimedia subsystem.

Optionally, in the electronic device, the first SIM may perform data exchange with a base station. For example, the first SIM is a main card performing data exchange with the base station, and the second SIM is a secondary card.

For the above action 201, reference may be made to the above action 101. It should be noted that, in a process in which the preset application downloads data through the communication radio frequency link based on a mobile network of the first SIM, the remaining online duration of the second SIM registered in the IMS is obtained.

Action 202, obtain a data demand of the preset application in a case that the remaining online duration is greater than a first preset duration and less than a second preset duration, where the first preset duration is greater than or equal to a duration required for the second subscriber identification module to re-register in the Internet protocol multimedia subsystem.

For the above action 202, reference may be made to the above action 102. It should be noted that, because the electronic device is connected to the IMS through the second SIM, the first preset duration herein is greater than or equal to the duration required for the second SIM to re-register in the IMS. Optionally, the second preset duration herein may alternatively be set based on an online duration assigned by the IMS server to the second SIM. This is not specifically limited in this embodiment of the present disclosure.

In a case that the remaining online duration of the second SIM registered in the IMS is greater than the above first preset duration and less than the above second preset duration, the data demand of the preset application through the communication radio frequency link based on the first SIM is obtained.

Action 203, set, in a case that the data demand is less than the preset data demand, that the second subscriber identification module performs re-registration in the Internet protocol multimedia subsystem through the communication radio frequency link.

For the action, reference may be similarly made to relevant description in the above action 103. It should be noted that, in a case that the data demand of the preset application through the communication radio frequency link based on the first SIM is less than the above preset data demand, it indicates that even if the communication radio frequency link is occupied by re-registration in this case, the preset application can also run relative smoothly, and does not get stuck or affect the usage experience of the user on the preset application. Therefore, the second SIM may perform re-registration in the IMS through the above communication radio frequency link, to maintain that the second SIM is not disconnected from the IMS, and the electronic device is not disconnected from the IMS.

Optionally, before the above action 203, the method may further include following actions: obtaining signal data corresponding to the second subscriber identification module, where the signal data includes: at least one of a signal-to-noise ratio or a signal strength. The above action 203 may include: setting, in a case that the data demand is less than the preset data demand and the signal data is greater than preset signal data, that the second subscriber identification module performs re-registration in the Internet protocol multimedia subsystem through the communication radio frequency link.

Optionally, before the above action 203, the signal data corresponding to the second SIM may be obtained, where the signal data is used for representing signal quality of the second SIM. The signal data may include: at least one of the signal-to-noise ratio or the signal strength. The preset signal data may be set according to actual requirements, which is not specifically limited. In a case that the data demand of the preset application through the communication radio frequency link based on the first SIM is less than the above preset data demand and the signal data of the second SIM is greater than the preset signal data, it indicates that even if the communication radio frequency link is occupied by re-registration in this case, the preset application can also run relative smoothly, and does not get stuck or affect the usage experience of the user on the preset application, and the signal quality of the second SIM is better at the same time. In a case that the signal quality of the second SIM is better, the speed at which the second SIM re-registers in the IMS through the above communication radio frequency link is faster, and an occupation time on the communication radio frequency link is shorter. Therefore, the second SIM may re-register in the IMS through the above communication radio frequency link, to maintain that the second SIM is not disconnected from the IMS, the electronic device is not disconnected from the IMS, and a time for the second SIM to occupy the communication radio frequency link during re-registration can be shorter, thereby reducing the influence on the smooth running of the preset application.

In this embodiment of the present disclosure, in a process in which the electronic device is connected to the IMS though the second SIM and the preset application downloads data through the communication radio frequency link based on the first SIM, in a case that the remaining online duration of the second SIM registered in the IMS is still relatively long, the second SIM does not directly re-register in the IMS through the communication radio frequency link, but the second SIM re-registers in the IMS when the preset application has a smaller data demand on a premise of ensuring that the second SIM is not disconnected from the IMS, which ensures that the second SIM is not disconnected from the IMS, the electronic device is not disconnected from the IMS, and the preset application can run smoothly through a mobile network provided by the first SIM during re-registration.

FIG. 3 is a flowchart of a third registration method according to an embodiment of the present disclosure. The registration method is similarly performed by an electronic device, the electronic device includes a communication radio frequency link, and the electronic device is connected to an IMS. For the electronic device, reference may be made to the above description. To avoid repetition, details are not described herein again. It should be noted that, a first SIM is installed in the electronic device, that is, the electronic device may be an electronic device with a single-card and single-standby, or an electronic device with a multi-card and multi-standby. The electronic device is connected to the IMS through the first SIM. The registration method may include following actions.

Action 301, obtain, in a process in which a preset application downloads data through the communication radio frequency link based on the first subscriber identification module, a remaining online duration of the first subscriber identification module registered in the Internet protocol multimedia subsystem.

Optionally, in the electronic device, the first SIM may perform data exchange with a base station, and is also connected to the IMS. For the above action 301, reference may be made to the above action 101. It should be noted that, in a process in which the preset application downloads data through the communication radio frequency link based on a mobile network of the first SIM, the remaining online duration of the first SIM registered in the IMS is obtained.

Action 302, obtain a data demand of the preset application in a case that the remaining online duration is greater than a first preset duration and less than a second preset duration, where the first preset duration is greater than or equal to a duration required for the first subscriber identification module to re-register in the Internet protocol multimedia subsystem.

For the above action 302, reference may be made to the above action 102. It should be noted that, because the electronic device is connected to the IMS through the first SIM, the first preset duration herein is greater than or equal to the duration required for the first SIM to re-register in the IMS. Optionally, the second preset duration herein may alternatively be set based on an online duration assigned by the IMS server to the first SIM. This is not specifically limited in this embodiment of the present disclosure.

In a case that the remaining online duration of the first SIM registered in the IMS is greater than the above first preset duration and less than the above second preset duration, the data demand of the preset application through the communication radio frequency link based on the first SIM is obtained.

Action 303, set, in a case that the data demand is less than the preset data demand, that the first subscriber identification module performs re-registration in the Internet protocol multimedia subsystem through the communication radio frequency link.

For the action, reference may be similarly made to relevant description in the above action 103. It should be noted that, in a case that the data demand of the preset application through the communication radio frequency link based on the first SIM is less than the above preset data demand, it indicates that even if the communication radio frequency link is occupied by re-registration in this case, the preset application can also run relative smoothly, and does not get stuck or affect the usage experience of the user on the preset application. Therefore, the first SIM may perform re-registration in the IMS through the above communication radio frequency link, to maintain that the first SIM is not disconnected from the IMS, and the electronic device is not disconnected from the IMS.

Optionally, before the above action 303, the method may further include following actions: obtaining signal data corresponding to the first subscriber identification module, where the signal data includes: at least one of a signal-to-noise ratio or a signal strength. The above action 303 may include: setting, in a case that the data demand is less than the preset data demand and the signal data is greater than preset signal data, that the first subscriber identification module performs re-registration in the Internet protocol multimedia subsystem through the communication radio frequency link.

Optionally, before the above action 303, the signal data corresponding to the first SIM may be obtained, where the signal data is used for representing signal quality of the first SIM. The signal data may include: at least one of the signal-to-noise ratio or the signal strength. The preset signal data may be set according to actual requirements, which is not specifically limited. In a case that the data demand of the preset application through the communication radio frequency link based on the first SIM is less than the above preset data demand and the signal data of the first SIM is greater than the preset signal data, it indicates that even if the communication radio frequency link is occupied by re-registration in this case, the preset application can also run relative smoothly, and does not get stuck or affect the usage experience of the user on the preset application, and the signal quality of the first SIM is better at the same time. In a case that the signal quality of the first SIM is better, the speed at which the second SIM re-registers in the IMS through the above communication radio frequency link is faster, and an occupation time on the communication radio frequency link is shorter. Therefore, the first SIM may re-register in the IMS through the above communication radio frequency link, to maintain that the first SIM is not disconnected from the IMS, the electronic device is not disconnected from the IMS, and a time for the first SIM to occupy the communication radio frequency link during re-registration can be shorter, thereby reducing the influence on the smooth running of the preset application.

In this embodiment of the present disclosure, in a process in which the electronic device is connected to the IMS though the first SIM and the preset application downloads data through the communication radio frequency link based on the first SIM, in a case that the remaining online duration of the first SIM registered in the IMS is still relatively long, the first SIM does not directly re-register in the IMS through the communication radio frequency link, but the first SIM re-registers in the IMS when the preset application has a smaller data demand on a premise of ensuring that the first SIM is not disconnected from the IMS, which ensures that the first SIM is not disconnected from the IMS, the electronic device is not disconnected from the IMS, and the preset application can run smoothly through a mobile network provided by the first SIM during re-registration.

FIG. 4 is a flowchart of a fourth registration method according to an embodiment of the present disclosure. The registration method is similarly performed by an electronic device, the electronic device includes a communication radio frequency link, and the electronic device is connected to an IMS. For the electronic device, reference may be made to the above description. To avoid repetition, details are not described herein again. The registration method may include following actions.

Action 401, obtain, in a process in which a preset application downloads data through the communication radio frequency link, a remaining online duration of the electronic device registered in the Internet protocol multimedia subsystem.

For action 401, reference may be made to relevant description of the above action 101. It should be noted that, the preset application may optionally include: at least one of a game application or a video application. Both the game application and the video application have higher requirements on a network. For example, in a case that the game application runs unsmoothly, a game character corresponding to a user may lose a game. For example, in a case that the video application runs unsmoothly, stuck playback may be caused, so that the viewing experience of a user is affected.

In this embodiment of the present disclosure, if the above preset application is the game application and that the game application downloads data through a communication link generally means that a user downloads data through the communication link to play the game application, the process in which the above preset application downloads data through the communication radio frequency link may be a process in which the user downloads data through the communication link to play the game application. If the above preset application is the video application and that the video application downloads data through a communication link generally means that a user downloads data through the communication link to view a video in the video application, the process in which the above preset application downloads data through the communication radio frequency link may be a process in which the user downloads data through the communication link to view a video in the video application.

Action 402, re-obtain, in a process in which the preset application downloads data through the communication radio frequency link in a case that the remaining online duration is greater than the second preset duration, the remaining online duration of the electronic device registered in the Internet protocol multimedia subsystem.

Optionally, the remaining online duration of the electronic device registered in the IMS is greater than the above second preset duration, which indicates that the remaining online duration of the electronic device registered in the IMS is still very long. In the process in which the preset application downloads data through the communication radio frequency link, the remaining online duration of the electronic device registered in the IMS may be re-obtained.

Action 403, obtain the data demand of the preset application in a case that the remaining online duration re-obtained is greater than the first preset duration and less than the second preset duration.

Optionally, the remaining online duration of the electronic device registered in the IMS is greater than the above second preset duration, which indicates that the remaining online duration of the electronic device registered in the IMS is still very long. In a case that the remaining online duration of the electronic device registered in the IMS is still very long, the data demand of the preset application is not obtained in time, so that re-registration is not performed, but the remaining online duration of the electronic device registered in the IMS is re-obtained in the process in which the preset application downloads data through the above communication radio frequency link, and the data demand of the preset application is re-obtained in a case that the remaining online duration re-obtained is greater than the above first preset duration and less than the above second preset duration. The achieved effect lies in that: in a case that the remaining online duration is still very long, re-registration is not performed, so that an unexpired online duration will not be wasted, thereby avoiding resource waste.

For example, for the above example, after the electronic device has successfully registered in the IMS, an online duration assigned by an IMS server to the electronic device is 20 minutes, the second preset duration may be 15 minutes, and the first preset duration may be 3 minutes. If an obtained remaining online duration of the electronic device registered in the IMS is 18 minutes and is greater than the above second preset duration, that is, the remaining online duration of the electronic device registered in the IMS is still very long, the data demand of the preset application is not obtained in time, so that re-registration is not performed. If a remaining online duration re-obtained of the electronic device registered in the IMS is 14.9 minutes in a process in which the above preset application downloads data through the communication radio frequency link, the remaining online duration re-obtained 14.9 minutes is greater than the first preset duration 3 minutes and less than the second preset duration 15 minutes, so that the data demand of the preset application is obtained.

Action 404, perform, in a case that the data demand is less than a preset data demand, re-registration in the Internet protocol multimedia subsystem through the communication radio frequency link.

For the above action 404, reference may be made to the above action 103, and the same beneficial effects can be achieved. To avoid repetition, details are not described herein again.

Action 405, perform, in a case that the remaining online duration is less than or equal to the first preset duration, re-registration in the Internet protocol multimedia subsystem through the communication radio frequency link.

The remaining online duration of the electronic device registered in the IMS is less than or equal to the above first preset duration, which indicates that the remaining online duration of the electronic device registered in the IMS is very short, and if re-registration is not performed in time, it may cause that the electronic device is disconnected from the IMS. Therefore, re-registration is directly performed in the IMS through the above communication radio frequency link, to maintain that the electronic device is not disconnected from the IMS.

For example, for the above example, after the electronic device has successfully registered in the IMS, an online duration assigned by an IMS server to the electronic device is 20 minutes, the second preset duration may be 15 minutes, and the first preset duration may be 3 minutes. If an obtained remaining online duration of the electronic device registered in the IMS is 3 minutes and is exactly equal to the above first preset duration, re-registration is directly performed in the IMS through the above communication radio frequency link.

In this embodiment of the present disclosure, if the above preset application is the game application, in the process in which the user downloads data through a communication link to play the game application, in a case that the remaining online duration of the electronic device registered in the IMS is greater than the above first preset duration and less than the above second preset duration and the game application has a smaller data demand, re-registration is performed in the IMS through the above communication radio frequency link, and the user loses a game not due to stuck smoothness caused by the re-registration when the user plays a game, and the like, so that the game experience of the user can be improved, and the electronic device being disconnected from the IMS is not caused.

In this embodiment of the present disclosure, the electronic device includes a communication radio frequency link, the electronic device is connected to an Internet protocol multimedia subsystem, and the method includes: obtaining, in a process in which a preset application downloads data through the communication radio frequency link, a remaining online duration of the electronic device registered in the Internet protocol multimedia subsystem; obtaining a data demand of the preset application in a case that the remaining online duration is greater than a first preset duration and less than a second preset duration, where the first preset duration is greater than or equal to a duration required for the electronic device to re-register in the Internet protocol multimedia subsystem; and performing, in a case that the data demand is less than a preset data demand, re-registration in the Internet protocol multimedia subsystem through the communication radio frequency link. That is, in the process in which the preset application downloads data through the communication radio frequency link, in a case that the remaining online duration of the electronic device registered in the IMS is still relatively long, the electronic device does not directly re-register in the IMS through the communication radio frequency link, but re-registers in the IMS when the preset application has a smaller data demand on a premise of ensuring that the electronic device is not disconnected from the IMS, which ensures that the electronic device is not disconnected from the IMS, and the preset application can run smoothly during re-registration.

It should be noted that, for ease of description, the method embodiments are stated as a combination of a series of actions. However, a person skilled in the art is to know that the embodiments of this application is not limited to the described action sequence, because according to the embodiments of this application, some steps may be performed in another sequence or simultaneously. In addition, a person skilled in the art is also to learn that the embodiments described in this specification are all exemplary embodiments, and the actions involved are not necessarily required by the embodiments of this application.

In an embodiment of the present disclosure, an electronic device 500 is further provided. The electronic device includes: a communication radio frequency link, and the electronic device is connected to an Internet protocol multimedia subsystem. For the electronic device, reference may be made to the above description. FIG. 5 is a schematic structural diagram of an electronic device according to an embodiment of the present disclosure. The electronic device 500 may include:

a remaining online duration obtaining module 501, configured to obtain, in a process in which a preset application downloads data through the communication radio frequency link, a remaining online duration of the electronic device registered in the Internet protocol multimedia subsystem;

a data demand obtaining module 502, configured to obtain a data demand of the preset application in a case that the remaining online duration is greater than a first preset duration and less than a second preset duration, where the first preset duration is greater than or equal to a duration required for the electronic device to re-register in the Internet protocol multimedia subsystem; and a first registration module 503, configured to perform, in a case that the data demand is less than a preset data demand, re-registration in the Internet protocol multimedia subsystem through the communication radio frequency link.

Figure 6:
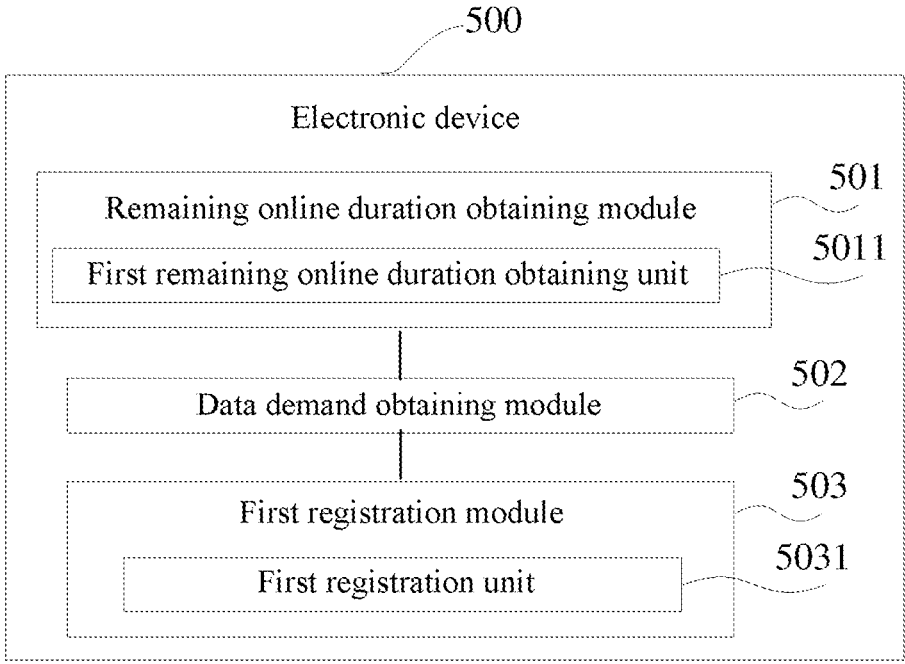
FIG. 6 is a structural block diagram of another electronic device according to an embodiment of the present disclosure.

Optionally, a first subscriber identification module and a second subscriber identification module are installed in the electronic device, and the electronic device is connected to the Internet protocol multimedia subsystem through the second subscriber identification module; and Based on FIG. 5, referring to FIG. 6, the remaining online duration obtaining module 501 includes:

a first remaining online duration obtaining unit 5011, configured to obtain, in a process in which the preset application downloads data through the communication radio frequency link based on the first subscriber identification module, a remaining online duration of the second subscriber identification module registered in the Internet protocol multimedia subsystem; and the first preset duration is greater than or equal to a duration required for the second subscriber identification module to re-register in the Internet protocol multimedia subsystem, and the first registration module 503 includes:

a first registration unit 5031, configured to set, in a case that the data demand is less than the preset data demand, that the second subscriber identification module performs re-registration in the Internet protocol multimedia subsystem through the communication radio frequency link.

Optionally, the electronic device further includes:

a signal data obtaining module, configured obtain signal data corresponding to the second subscriber identification module, where the signal data includes: at least one of a signal-to-noise ratio or a signal strength.

The first registration unit 5031 includes:

a first registration sub-unit, configured to set, in a case that the data demand is less than the preset data demand and the signal data is greater than preset signal data, that the second subscriber identification module performs re-registration in the Internet protocol multimedia subsystem through the communication radio frequency link.

Optionally, a first subscriber identification module is installed in the electronic device, and the electronic device is connected to the Internet protocol multimedia subsystem through the first subscriber identification module. The remaining online duration obtaining module 501 includes:

a second remaining online duration obtaining unit, configured to obtain, in a process in which the preset application downloads data through the communication radio frequency link based on the first subscriber identification module, a remaining online duration of the first subscriber identification module registered in the Internet protocol multimedia subsystem; and the first preset duration is greater than or equal to a duration required for the first subscriber identification module to re-register in the Internet protocol multimedia subsystem, and the first registration module 503 includes:

a second registration unit, configured to set, in a case that the data demand is less than the preset data demand, that the first subscriber identification module performs re-registration in the Internet protocol multimedia subsystem through the communication radio frequency link.

Optionally, the electronic device further includes:

a re-obtaining module, configured to re-obtain, in a process in which the preset application downloads data through the communication radio frequency link in a case that the remaining online duration is greater than the second preset duration, the remaining online duration of the electronic device registered in the Internet protocol multimedia subsystem.

The data demand obtaining module 502 includes:

a data demand obtaining unit, configured to obtain the data demand of the preset application in a case that the remaining online duration re-obtained is greater than the first preset duration and less than the second preset duration.

Optionally, the electronic device further includes:

a second registration module, configured to perform, in a case that the remaining online duration is less than or equal to the first preset duration, re-registration in the Internet protocol multimedia subsystem through the communication radio frequency link.

Optionally, the preset application includes: at least one of a game application or a video application.

The electronic device according to this embodiment of the present disclosure can implement all processes implemented by the electronic device described in the method embodiments shown in FIG. 1 to FIG. 4, and can achieve the corresponding beneficial effects. To avoid repetition, details are not described herein again.

Figure 7:
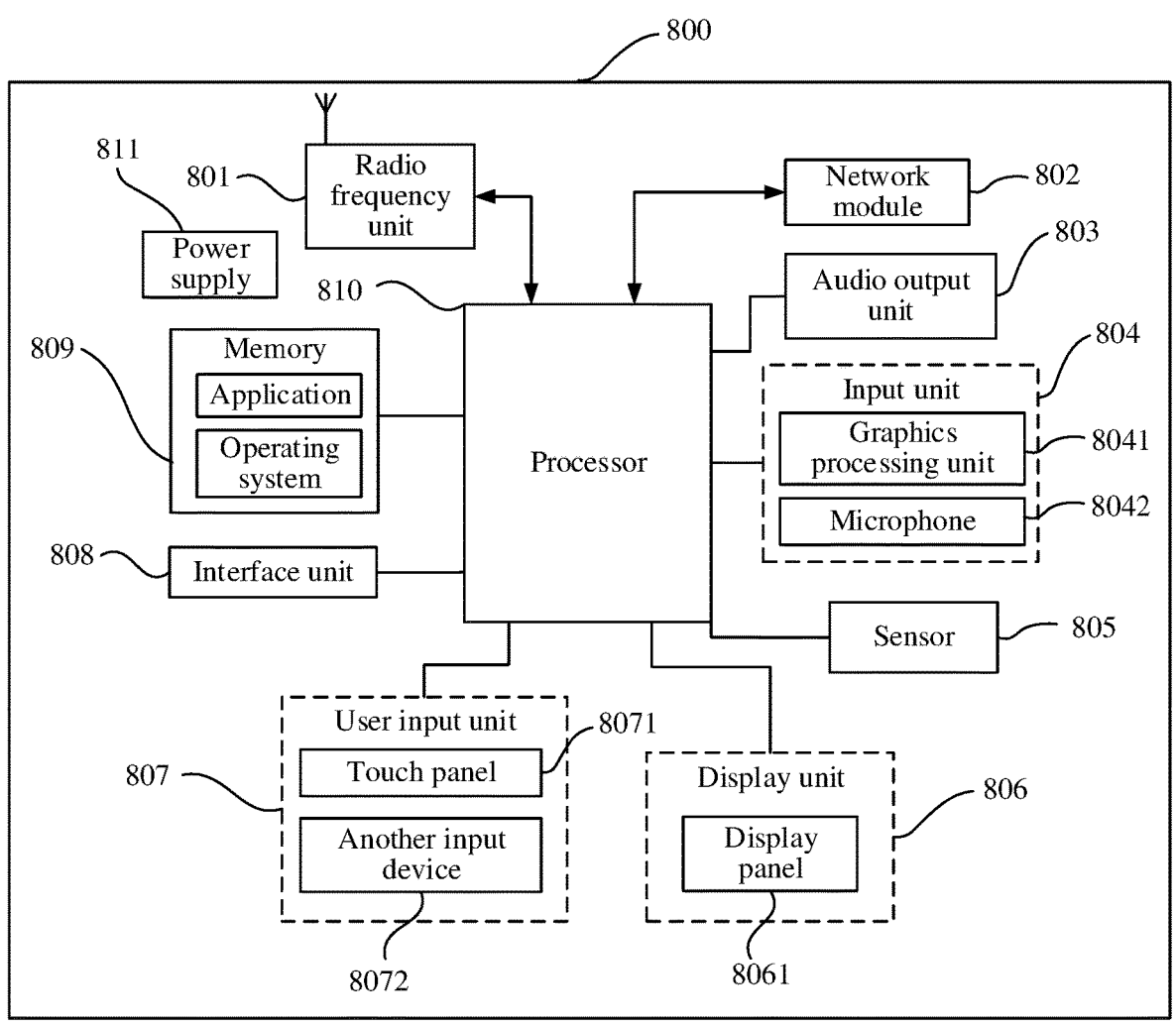
FIG. 7 is a schematic diagram of a hardware structure of an electronic device according to various embodiments of the present disclosure.

FIG. 7 is a schematic diagram of a hardware structure of an electronic device that implements various embodiments of the present disclosure. The electronic device 800 includes, but is not limited to, components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the structure of the electronic device shown in FIG. 7 constitutes no limitation on the electronic device, and the electronic device may include more or fewer components than those shown in the figure, or some components may be combined, or a different component deployment may be used. In an embodiment of the present disclosure, the electronic device includes, but is not limited to, a mobile phone, a tablet computer, a notebook computer, a palmtop computer, an in-vehicle terminal, a wearable device, a pedometer, and the like.

The processor 810 is configured to obtain, in a process in which a preset application downloads data through a communication radio frequency link, a remaining online duration of the electronic device registered in an Internet protocol multimedia subsystem;

obtain a data demand of the preset application in a case that the remaining online duration is greater than a first preset duration and less than a second preset duration, where the first preset duration is greater than or equal to a duration required for the electronic device to re-register in the Internet protocol multimedia subsystem; and perform, in a case that the data demand is less than a preset data demand, re-registration in the Internet protocol multimedia subsystem through the communication radio frequency link.

In this embodiment of the present disclosure, in the process in which the preset application downloads data through the communication radio frequency link, in a case that the remaining online duration of the electronic device registered in the IMS is still relatively long, the electronic device does not directly re-register in the IMS through the communication radio frequency link, but re-registers in the IMS when the preset application has a smaller data demand on a premise of ensuring that the electronic device is not disconnected from the IMS, which ensures that the electronic device is not disconnected from the IMS, and the preset application can run smoothly during re-registration.

It is to be understood that, in this embodiment of the present disclosure, the radio frequency unit 801 may be configured to transmit and receive information or transmit and receive signals during a call. Optionally, the radio frequency unit is configured to receive downlink data from a base station and transmit downlink data to the processor 810 for processing. In addition, the radio frequency unit transmits uplink data to the base station. Generally, the radio frequency unit 801 includes, but is not limited to, an antenna, at least one amplifier, a transceiver, a coupler, a low noise amplifier, a duplexer, and the like. In addition, the radio frequency unit 801 may further communicate with another device through a wireless communication system and a network.

The electronic device provides wireless broadband Internet access for a user by using the network module 802, for example, allowing the user to send and receive emails, browse webpages, access streaming media content, and the like.

The audio output unit 803 may convert audio data received by the radio frequency unit 801 or the network module 802 or stored on the memory 809 into audio signals and output the audio signals as sounds. In addition, the audio output unit 803 may further provide audio output (for example, a call signal reception sound or a message reception sound) related to a specific function performed by the electronic device 800. The audio output unit 803 includes a speaker, a buzzer, a receiver, and the like.

The input unit 804 is configured to receive an audio or video signal. The input unit 804 may include a graphics processing unit (GPU) 8041 and a microphone 8042. The graphics processing unit 8041 performs processing on image data of a static picture or a video that is obtained by an image acquisition apparatus (for example, a camera) in a video acquisition mode or an image acquisition mode. The processed image frame may be displayed on the display unit 806. An image frame that has been processed by the graphics processing unit 8041 may be stored in the memory 809 (or another storage medium) or sent by using the radio frequency unit 801 or the network module 802. The microphone 8042 may receive a sound and can process such a sound into audio data. The processed audio data may be converted, in a phone call mode, into a format that may be sent by the radio frequency unit 801 to a mobile communication base station.

The electronic device 800 further includes at least one sensor 805 such as an optical sensor, a motion sensor, or another sensor. For example, the optical sensor includes an ambient light sensor and a proximity sensor. The ambient light sensor may adjust luminance of a display panel 8061 according to brightness of the ambient light. The proximity sensor may switch off the display panel 8061 and/or backlight when the electronic device 800 is moved to the ear. As a type of motion sensor, an acceleration sensor can detect magnitudes of accelerations in various directions (generally, on three axes), may detect a magnitude and a direction of the gravity in a static state, and may be applied to recognizing an altitude of the electronic device (for example, switching between a landscape state and a portrait state, a related game, and magnetometer attitude calibration), a function related to vibration recognition (such as a pedometer and a knock), and the like. The sensor 805 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 806 is configured to display information inputted by the user or information provided for the user. The display unit 806 may include a display panel 8061. The display panel 8061 may be configured in the form of a liquid crystal display (LCD), an organic light-emitting diode (OLED), or the like.

The user input unit 807 may be configured to receive input digital or character information, and generate a keyboard signal input related to the user setting and function control of the electronic device. Optionally, the user input unit 807 includes a touch panel 8071 and another input device 8072. The touch panel 8071, also referred to as a touchscreen, may collect a touch operation of a user on or near the touch panel (such as an operation of a user on or near the touch panel 8071 by using any suitable object or attachment, such as a finger or a touch pen). The touch panel 8071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 810. Moreover, the touch controller may receive and execute a command transmitted from the processor 810. In addition, the touch panel 8071 may be implemented by using various types, such as a resistive type, a capacitance type, an infrared type, and a surface acoustic wave type. In addition to the touch panel 8071, the user input unit 807 may further include another input device 8072. Optionally, the another input device 8072 may include, but is not limited to, a physical keyboard, a functional key (for example, a volume control key or a switch key), a track ball, a mouse, and a joystick, and the details will not be described herein again.

Optionally, the touch panel 8071 may cover the display panel 8061. After detecting a touch operation on or near the touch panel, the touch panel 8071 transfers the touch operation to the processor 810, to determine a type of a touch event. Then, the processor 810 provides a corresponding visual output on the display panel 8061 according to the type of the touch event. In FIG. 7, the touch panel 8071 and the display panel 8061 implement, as two independent parts, input and output functions of the electronic device. However, in some embodiments, the touch panel 8071 and the display panel 8061 may be integrated to implement the input and output functions of the electronic device. The details are not limited herein.

The interface unit 808 is an interface for connecting an external apparatus and the electronic device 800. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 808 may be configured to receive an input (for example, data information or electricity) from an external device and transmit the received input to one or more elements in the electronic device 800, or may be configured to transmit data between the electronic device 800 and the external apparatus.

The memory 809 may be configured to store a software program and various data. The memory 809 may mainly include a program storage region and a data storage region. The program storage region may store an operating system, an application program required by at least one function (for example, a sound playback function and an image playback function), or the like. The data storage region may store data (for example, audio data and a phone book) created according to use of the mobile phone. In addition, the memory 809 may include a high speed random access memory, and may also include a non-volatile memory, such as at least one magnetic disk storage device, a flash memory, or another volatile solid-state storage device.

The processor 810 is a control center of the electronic device, and connects to various parts of the electronic device by using various interfaces and lines. By running or executing the software program and/or module stored in the memory 809, and invoking data stored in the memory 809, the processor performs various functions and data processing of the electronic device, thereby performing overall monitoring on the electronic device. Optionally, the processor 810 may include one or more processing units. Optionally, the processor 810 may integrate an application processor and a modem. The application processor mainly processes an operating system, a user interface, an application program, and the like. The modem mainly processes wireless communication. It may be understood that the foregoing modem may not be integrated into the processor 810.

The electronic device 800 may further include the power supply 811 (for example, a battery) for supplying power to the components. Optionally, the power supply 811 may be logically connected to the processor 810 by a power management system, thereby implementing functions such as charging, discharging, and power consumption management by using the power management system.

In addition, the electronic device 800 includes some functional module that are not shown, which are not described herein in detail.

Optionally, an embodiment of the present disclosure further provides an electronic device, including a processor 810, a memory 809, and a computer program stored on the memory 809 and executable on the processor 810, the computer program, when executed by the processor 810, implementing all processes of the embodiments of the registration method described above, and can achieve the same technical effects. To avoid repetition, details are not described herein again.

An embodiment of the present disclosure further provides a non-transitory computer readable storage medium, storing a computer program, the computer program, when executed by a processor, implementing all processes of the embodiments of the registration method described above, and can achieve the same technical effects. To avoid repetition, details are not described herein again. The non-transitory computer readable storage medium may include a flash drive, a read-only memory (ROM), a random access memory (RAM), a magnetic disk, or an optical disc.

It should be noted that, the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present disclosure.

The embodiments of the present disclosure are described above with reference to the accompanying drawings. However, the present disclosure is not limited to the foregoing specific implementations. The foregoing specific implementations are illustrative instead of limitative. Enlightened by the present disclosure, a person of ordinary skill in the art can make many forms without departing from the idea of the present disclosure and the scope of protection of the claims. All of the forms fall within the protection of the present disclosure.

What is claimed is:

1. A registration method, performed by an electronic device, wherein the electronic device is connected to an Internet protocol multimedia subsystem, and the method comprises:

obtaining, in a process in which a preset application downloads data through a communication radio frequency link, a remaining online duration of the electronic device registered in the Internet protocol multimedia subsystem;

obtaining a data demand of the preset application when the remaining online duration is greater than a first preset duration and less than a second preset duration, wherein the first preset duration is greater than or equal to a duration required for the electronic device to re-register in the Internet protocol multimedia subsystem; and performing, when the data demand is less than a preset data demand, re-registration in the Internet protocol multimedia subsystem through the communication radio frequency link.

2. The method according to claim 1, wherein a first subscriber identification module and a second subscriber identification module are installed in the electronic device, and the electronic device is connected to the Internet protocol multimedia subsystem through the second subscriber identification module, and the obtaining, in the process in which the preset application downloads data through the communication radio frequency link, the remaining online duration of the electronic device registered in the Internet protocol multimedia subsystem comprises:

obtaining, in the process in which the preset application downloads data through the communication radio frequency link based on the first subscriber identification module, a remaining online duration of the second subscriber identification module registered in the Internet protocol multimedia subsystem; and the first preset duration is greater than or equal to a duration required for the second subscriber identification module to re-register in the Internet protocol multimedia subsystem, and the performing, when the data demand is less than the preset data demand, re-registration in the Internet protocol multimedia subsystem through the communication radio frequency link comprises:

setting, in a case that the data demand is less than the preset data demand, that the second subscriber identification module performs re-registration in the Internet protocol multimedia subsystem through the communication radio frequency link.

3. The method according to claim 2, wherein before the setting, in a case that the data demand is less than the preset data demand, that the second subscriber identification module performs re-registration in the Internet protocol multimedia subsystem through the communication radio frequency link, the method further comprises:

obtaining signal data corresponding to the second subscriber identification module, wherein the signal data comprises: at least one of a signal-to-noise ratio or a signal strength; and the setting, in a case that the data demand is less than the preset data demand, that the second subscriber identification module performs re-registration in the Internet protocol multimedia subsystem through the communication radio frequency link comprises:

setting, in a case that the data demand is less than the preset data demand and the signal data is greater than preset signal data, that the second subscriber identification module performs re-registration in the Internet protocol multimedia subsystem through the communication radio frequency link.

4. The method according to claim 1, wherein a first subscriber identification module is installed in the electronic device, and the electronic device is connected to the Internet protocol multimedia subsystem through the first subscriber identification module, and the obtaining, in the process in which the preset application downloads data through the communication radio frequency link, the remaining online duration of the electronic device registered in the Internet protocol multimedia subsystem comprises:

obtaining, in the process in which the preset application downloads data through the communication radio frequency link based on the first subscriber identification module, a remaining online duration of the first subscriber identification module registered in the Internet protocol multimedia subsystem; and the first preset duration is greater than or equal to a duration required for the first subscriber identification module to re-register in the Internet protocol multimedia subsystem, and the performing, when the data demand is less than the preset data demand, re-registration in the Internet protocol multimedia subsystem through the communication radio frequency link comprises:

setting, in a case that the data demand is less than the preset data demand, that the first subscriber identification module performs re-registration in the Internet protocol multimedia subsystem through the communication radio frequency link.

5. The method according to claim 1, wherein before the obtaining the data demand of the preset application when the remaining online duration is greater than the first preset duration and less than the second preset duration, the method further comprises:

re-obtaining, in the process in which the preset application downloads data through the communication radio frequency link in a case that the remaining online duration is greater than the second preset duration, the remaining online duration of the electronic device registered in the Internet protocol multimedia subsystem; and the obtaining the data demand of the preset application when the remaining online duration is greater than the first preset duration and less than the second preset duration comprises:

obtaining the data demand of the preset application in a case that the remaining online duration re-obtained is greater than the first preset duration and less than the second preset duration; and performing, in a case that the remaining online duration is less than or equal to the first preset duration, re-registration in the Internet protocol multimedia subsystem through the communication radio frequency link.

6. An electronic device, comprising a processor, a memory, and a computer program stored in the memory and executable on the processor, wherein the electronic device is connected to an Internet protocol multimedia subsystem, and the computer program, when executed by the processor, causes the electronic device to perform:

obtaining, in the process in which a preset application downloads data through a communication radio frequency link, a remaining online duration of the electronic device registered in the Internet protocol multimedia subsystem;

obtaining a data demand of the preset application when the remaining online duration is greater than a first preset duration and less than a second preset duration, wherein the first preset duration is greater than or equal to a duration required for the electronic device to re-register in the Internet protocol multimedia subsystem; and performing, when the data demand is less than a preset data demand, re-registration in the Internet protocol multimedia subsystem through the communication radio frequency link.

7. The electronic device according to claim 6, wherein a first subscriber identification module and a second subscriber identification module are installed in the electronic device the electronic device is connected to the Internet protocol multimedia subsystem through the second subscriber identification module, and the computer program, when executed by the processor, causes the electronic device to perform:

obtaining, in the process in which the preset application downloads data through the communication radio frequency link based on the first subscriber identification module, a remaining online duration of the second subscriber identification module registered in the Internet protocol multimedia subsystem, the first preset duration is greater than or equal to a duration required for the second subscriber identification module to reregister in the Internet protocol multimedia subsystem; and setting, in a case that the data demand is less than the preset data demand, that the second subscriber identification module performs re-registration in the Internet protocol multimedia subsystem through the communication radio frequency link.

8. The electronic device according to claim 7, wherein the computer program, when executed by the processor, causes the electronic device to further perform:

obtaining signal data corresponding to the second subscriber identification module, wherein the signal data comprises: at least one of a signal-to-noise ratio or a signal strength; and setting, in a case that the data demand is less than the preset data demand and the signal data is greater than preset signal data, that the second subscriber identification module performs re-registration in the Internet protocol multimedia subsystem through the communication radio frequency link.

9. The electronic device according to claim 6, wherein a first subscriber identification module is installed in the electronic device, and the electronic device is connected to the Internet protocol multimedia subsystem through the first subscriber identification module, and the computer program, when executed by the processor, causes the electronic device to perform:

obtaining, in the process in which the preset application downloads data through the communication radio frequency link based on the first subscriber identification module, a remaining online duration of the first subscriber identification module registered in the Internet protocol multimedia subsystem, wherein the first preset duration is greater than or equal to a duration required for the first subscriber identification module to re-register in the Internet protocol multimedia subsystem; and setting, in a case that the data demand is less than the preset data demand, that the first subscriber identification module performs re-registration in the Internet protocol multimedia subsystem through the communication radio frequency link.

10. The electronic device according to claim 6, wherein the computer program, when executed by the processor, causes the electronic device to further perform:

re-obtaining, in the process in which the preset application downloads data through the communication radio frequency link in a case that the remaining online duration is greater than the second preset duration, the remaining online duration of the electronic device registered in the Internet protocol multimedia subsystem;

obtaining the data demand of the preset application in a case that the remaining online duration re-obtained is greater than the first preset duration and less than the second preset duration; and performing, in a case that the remaining online duration is less than or equal to the first preset duration, re-registration in the Internet protocol multimedia subsystem through the communication radio frequency link.

11. A non-transitory computer readable storage medium, storing a computer program, wherein the computer program, when executed by a processor of an electronic device that is connected to an Internet protocol multimedia subsystem, causes the electronic device to perform:

obtaining, in a process in which a preset application downloads data through a communication radio frequency link, a remaining online duration of the electronic device registered in the Internet protocol multimedia subsystem;

obtaining a data demand of the preset application when the remaining online duration is greater than a first preset duration and less than a second preset duration, wherein the first preset duration is greater than or equal to a duration required for the electronic device to re-register in the Internet protocol multimedia subsystem; and performing, when the data demand is less than a preset data demand, re-registration in the Internet protocol multimedia subsystem through the communication radio frequency link.

12. The non-transitory computer readable storage medium according to claim 11, wherein a first subscriber identification module and a second subscriber identification module are installed in the electronic device, the electronic device is connected to the Internet protocol multimedia subsystem through the second subscriber identification module, and the computer program, when executed by the processor, causes the electronic device to perform:

obtaining, in the process in which the preset application downloads data through the communication radio frequency link based on the first subscriber identification module, a remaining online duration of the second subscriber identification module registered in the Internet protocol multimedia subsystem, wherein the first preset duration is greater than or equal to a duration required for the second subscriber identification module to re-register in the Internet protocol multimedia subsystem; and setting, in a case that the data demand is less than the preset data demand, that the second subscriber identification module performs re-registration in the Internet protocol multimedia subsystem through the communication radio frequency link.

13. The non-transitory computer readable storage medium according to claim 12, wherein the computer program, when executed by the processor, causes the electronic device to further perform:

obtaining signal data corresponding to the second subscriber identification module, wherein the signal data comprises: at least one of a signal-to-noise ratio or a signal strength;

setting, in a case that the data demand is less than the preset data demand and the signal data is greater than preset signal data, that the second subscriber identification module performs re-registration in the Internet protocol multimedia subsystem through the communication radio frequency link.

14. The non-transitory computer readable storage medium according to claim 11, wherein a first subscriber identification module is installed in the electronic device, and the electronic device is connected to the Internet protocol multimedia subsystem through the first subscriber identification module, and the computer program, when executed by the processor, causes the electronic device to perform:

obtaining, in the process in which the preset application downloads data through the communication radio frequency link based on the first subscriber identification module, a remaining online duration of the first subscriber identification module registered in the Internet protocol multimedia subsystem, wherein the first preset duration is greater than or equal to a duration required for the first subscriber identification module to re-register in the Internet protocol multimedia subsystem; and setting, in a case that the data demand is less than the preset data demand, that the first subscriber identification module performs re-registration in the Internet protocol multimedia subsystem through the communication radio frequency link.

15. The non-transitory computer readable storage medium according to claim 11, wherein the computer program, when executed by the processor, causes the electronic device to further perform:

re-obtaining, in the process in which the preset application downloads data through the communication radio frequency link in a case that the remaining online duration is greater than the second preset duration, the remaining online duration of the electronic device registered in the Internet protocol multimedia subsystem;

obtaining the data demand of the preset application in a case that the remaining online duration re-obtained is greater than the first preset duration and less than the second preset duration; and performing, in a case that the remaining online duration is less than or equal to the first preset duration, re-registration in the Internet protocol multimedia subsystem through the communication radio frequency link.

* * * * *